United States Patent [19]

Uemura et al.

[11] Patent Number: 4,956,639

[45] Date of Patent: Sep. 11, 1990

[54] DISPLAY DATA PROCESSING DEVICE

[75] Inventors: Susumu Uemura, Kyoto; Hiroshi Tsujioka, Nara; Yasuhumi Yatsuzuka, Yamatokoriyama; Tadashi Tomino, Yamatokoriyama; Shigeo Yoneda, Yamatokoriyama; Shigeru Shindoh, Yamatokoriyama, all of Japan

[73] Assignee: Sharp Kabushiki Kaisha, Osaka, Japan

[21] Appl. No.: 401,504

[22] Filed: Aug. 30, 1989

Related U.S. Application Data

[63] Continuation of Ser. No. 944,511, Dec. 22, 1986, abandoned.

[30] Foreign Application Priority Data

Dec. 23, 1985 [JP] Japan ................................. 60-294969

[51] Int. Cl.⁵ .............................................. G09G 1/00
[52] U.S. Cl. ..................................... 340/707; 358/148
[58] Field of Search ....................... 340/706, 707, 720; 358/10, 11, 12, 141, 142, 146, 147, 148, 93; 235/471, 474

[56] References Cited

U.S. PATENT DOCUMENTS

| | | | |
|---|---|---|---|
| 3,737,566 | 6/1973 | Baer et al. | 358/93 |
| 3,984,862 | 10/1976 | Volz | 340/707 |
| 3,993,861 | 11/1976 | Baer | 340/707 |
| 4,329,684 | 5/1982 | Monteath et al. | 340/707 |
| 4,654,700 | 3/1987 | Baer | 340/707 |

FOREIGN PATENT DOCUMENTS 0007912  9/1983  European Pat. Off.
2544462 10/1975  Fed. Rep. of Germany.

*Primary Examiner*—Jeffery A. Brier

[57] ABSTRACT

A display data processing device for processing bar code data displayed on a display screen such as a television monitor by an interlaced scanning process includes a photosensor for reading bar code data displayed on the screen, a counter circuit for counting the coded data bits read by the photosensor means to determine whether the data is displayed by an odd-number field or an even-number field and which produces a signal corresponding to the result of the determination. This signal is used in conjunction with a plurality of timer circuits which provide signals corresponding to the duration of odd and even number field scanning periods to ensure accurate storing of data in a shift register which is provided with the output signals of the photosensor.

9 Claims, 3 Drawing Sheets

DISPLAY DATA PROCESSING DEVICE

This application is a continuation of application Ser. No. 944,511 filed on Dec. 22, 1986, now abandoned.

BACKGROUND OF THE INVENTION

This invention relates to a display data processing device for reading code information displayed on a certain display area of TV screen by interlace scanning (NTSC system television), and outputting the information to a printer or display unit.

There have been recently developed devices for reading coded information such as characters and pictures displayed on part of a TV screen by means of a photo sensor, and reproducing and delivering the information in the form of characters or pictures by means of a printer or display unit. In such devices, the format of a code 1 displayed in a certain display area of a TV screen is expressed, for example, in 10 bars as shown in FIG. 1, each bar corresponding to one bit, and depending on whether the bars are displayed or not, a 10-bit coded information signal can be displayed.

The code 1 is surrounded by a blank display region 2 and a white frame display region 3, so that only the code 1 can be read by the sensor. In this method, however, because of the presence of blank display region 2 and white frame display region 3, the region actually available for the display of code information is small, and much coded information cannot be displayed at once. To solve this problem, the code may be displayed in the entire code display region as shown in FIG. 2. In this method, a 16-bit coded information signal may be displayed, as compared with the 10 bits of FIG. 1, in the same display area. This method, however, has the problem that the coded information in such format cannot be read correctly when the coded information is displayed in the interlacing scanning method.

That is, in the NTSC system, the scanning lines of the screen are first scanned every other line, in the odd-numbered lines, and the remaining even-numbered lines are scanned the second time, thereby making a complete picture. The number of scanning lines is 525, and by scanning the same screen twice at a vertical scanning time of 1/60 sec, 30 screens are displayed in a second. In FIG. 3 and FIG. 4, thick-lines a indicate a first scanning screen, and thin-lines b denote a second scanning screen, and these two screens are combined to make up a full screen composed of a total of 525 scanning lines.

Therefore, in order to deliver a code on the screen once in every 1/60 sec, since the total number of scanning lines is 525, which is an odd number, there is a time difference between codes of one horizontal scanning time (63.492 $\mu$sec) between the change from the first screen to the second screen and the change from the second screen to the first screen, which causes a serious problem that the picture and code cannot by accurately separated and recognized.

SUMMARY OF THE INVENTION

This invention is devised in light of the above-discussed problems, and it is hence a primary object of this invention to provide a display data processing device capable of displaying an increased amount of coded information at once in a limited code display region, by reading the coded information displayed according to the odd-numbered field scanning and even-numbered field scanning on a display screen, and accurately separating and recognizing pictures and codes.

Other objects and further scope of applicability of the present invention will become apparent from the detailed description given hereinafter. It should be understood, however, that the detailed description of and specific examples, while indicating preferred embodiments of the invention are given by way of illustration only, since various changes and modifications within the spirit and scope of the invention will become apparent to those skilled in the art from this detailed description.

To achieve the above objects, a display data processing device comprises means for reading the coded information displayed on a display screen in an interlacing scanning system, means for judging whether the coded informtion on the display screen is displayed by field scanning of either an odd number or even number, and means for controlling said reading means to match with the timing corresponding to the field scanning depending on the result of the judgement.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

This invention is further described below referring to the accompanying drawings.

Figure 5:
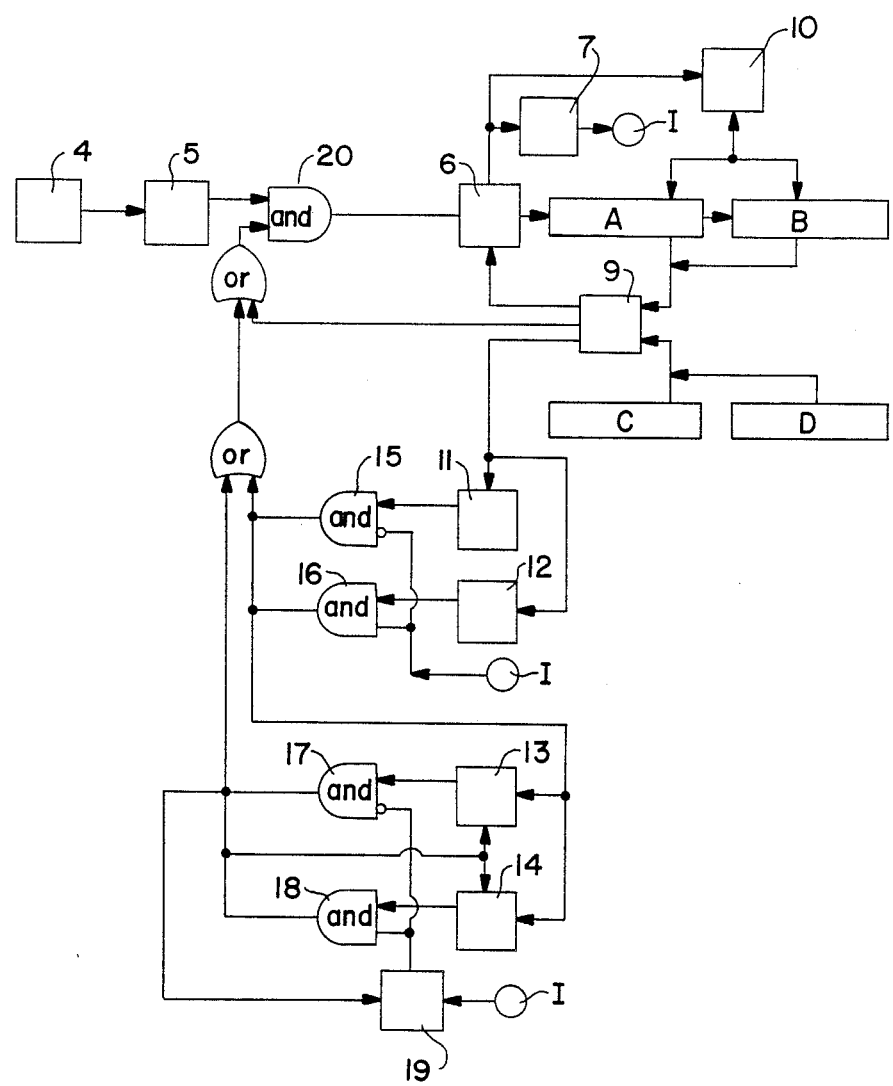
FIG. 5 is a block diagram of the device of this invention.

FIG. 5 is a block diagram of a display data processing device according to this invention.

In the drawing, numeral 4 denotes a photo sensor which is disposed opposite the code information display region of a TV display screen so as to read the information displayed there. In this code information display region, a normal television picture is usually displayed except when displaying coded information.

Numeral 5 is a waveform shaping circuit of the information read by the photo sensor 4. The output of this waveform shaping circuit 5 is gated by an AND gate 20, and stored in 8-bit shift registers A and B via a counter 6 in the next stage. Two 8-bit registers are used for the read data because the coded information is expressed in 16 bits. Registers A and B may be modified depending on the number of bits of coded information.

The counter 6 counts the number of bits of the read data, and judges, depending on the count, whether the field scanning on the TV display screen at that time is an odd-number field scanning or an even-number field scanning. In this example, when the count is 16, it is judged that an even-number field scanning is present (262 scanning lines), "1" is set up on a flag 7 at the same time, and the signal ①  delivered from this flag 7 becomes high. On the other hand, when the count is 17, it is judged to be an odd-number field scanning (263 scanning lines), "0" is set up on flag 7 at the same time, and the signal Ⓘ delivered from this flag 7 becomes low. The flag 7 is set only when a coincidence detection is established by a specific code (start code) mentioned later.

Numeral 10 is a timer for generating a clock with a 63.492 μsec period, operated by the output from counter 6, and shifts said registers A and B in the rightward direction to store the data into the registers. In particular, by causing the clock period to be the horizontal sync signal of the TV screen, it is designed to receive the data from the sensor 4 in synchronism with the horizontal sync signal.

In 8-bit shift registers C and D, a specific code (start code) converted to hexadecimal notation is preliminarily stored. Numeral 9 is a coincidence detection circuit which detects a coincidence between the data in the 8-bit shift registers A, B and the start code of the 8-bit shift registers C, D, and at the moment of coincidence, a clear signal is delivered to the counter 6, a LOW signal is delivered to the AND gate 20, and a start signal is delivered to timer circuits 11, 12 which are explained later. When the power is first turned on, the counter 6 is cleared, a HIGH signal is applied to the AND gate 20, and the data is sequentially read out from the sensor 4.

The timer circuit 11 delivers a HIGH signal for the time width necessary for reading all coded information, at a time (262/(30×525)- code display time) seconds afer the start signal is produced by the coincidence detection circuit 9. Similarly, the timer 12 delivers a HIGH signal for a similar time width after (263/(30×525)-code display time) seconds after receiving the start signal.

The outputs of these timers are gated by AND gates 15, 16 introducing the output signal Ⓘ of the flag 7 and its inverted signal, and the outputs of the gates 15, 16 are applied to the AND gate 20 through the OR gates 24 and 22 and are also applied as a start signal to timer circuits 13, 14 described below. That is, either one of the timer circuits 11, 12 is made effective depending on the state of output signal Ⓘ of the flag 7. The timer circuit 13 delivers a HIGH signal for the time width necessary for reading all coded information, at a time 262/(30×525) seconds (corresponding to the vertical sync signal in even-number field scanning) after receiving a start signal from said timer circuit 11 or 12. Similarly, the other timer circuit 14 delivers a HIGH signal for the time width necessary for reading all coded information, at a time 263/(30×525) seconds (corresponding to the vertical sync signal of odd-number field scanning) after receiving the start signal.

Numeral 17 is an AND gate circuit which controls the output of timer circuit 13 depending on the output signal from a T-shaped flip-flop circuit 19 introduced through an inverter, and 18 is an AND gate circuit for controlling the output of the other timer circuit 14 depending on the output signal from the circuit 19. The T-shaped flip-flop circuit 19 receives output signal Ⓘ from the flag 7, and inverts this signal, and this output signal is inverted from HIGH to LOW and vice versa every time the outputs from the AND gate circuits 17, 18 are received. The outputs of the AND gate circuits 17, 18 are applied to the AND gate 20 through the OR gates 24 and 22 and are also used as reset signals for the timer circuits 13, 14. That is, the outputs of timers 13, 14 may be valid alternately.

The operation is described below.

When the power is first turned on, the counter 6 is cleared, and a HIGH signal is applied to AND gate circuit 20. Therefore, the picture displayed on the code information display region of a TV display unit (not shown) is read by the sensor 4 and is outputted to the counter 6. The counter 6 generates a signal, by which the timer 10 is operated, and a clock signal of 63.492 μsec is supplied to 8-bit shift registers A, B. Therefore, the display data read by the sensor is sequentially stored into the shift registers A and B, in synchronism with the horizontal sync signal of TV. The display data (16-bit portion) thus stored in the shift registers A, B is compared in the comparison circuit 9 with the specific code (start code) stored in the shift registers C, D.

Figure 1:
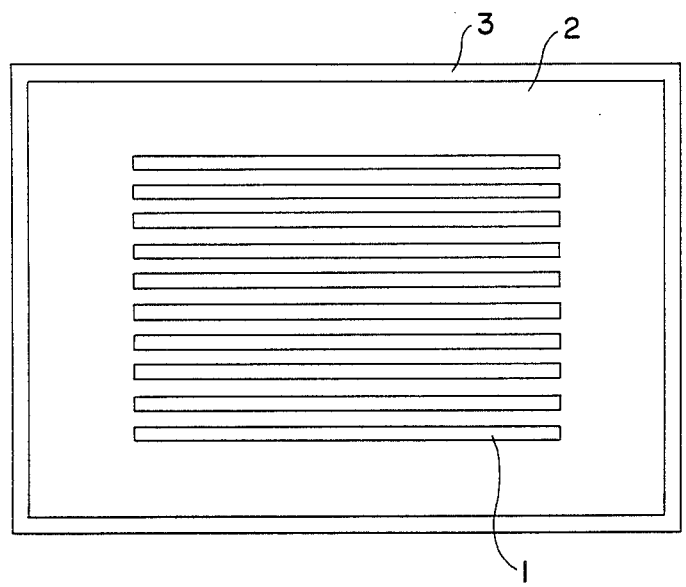
FIG. 1 and FIG. 2 are diagrams showing the state of code signal displayed in a code information display region of a TV screen.
Figure 2:
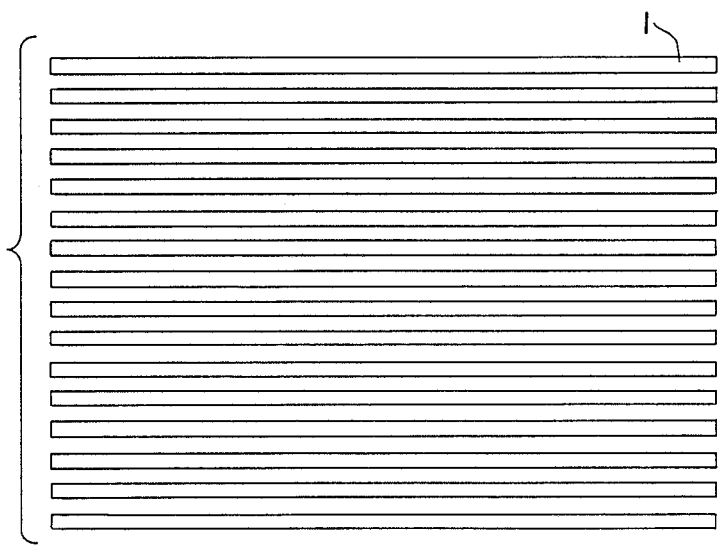
Figure 3:
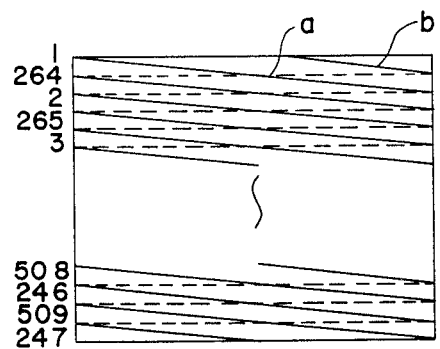
FIG. 3 and FIG. 4 are diagrams explaining the interlacing scanning method.
Figure 4:
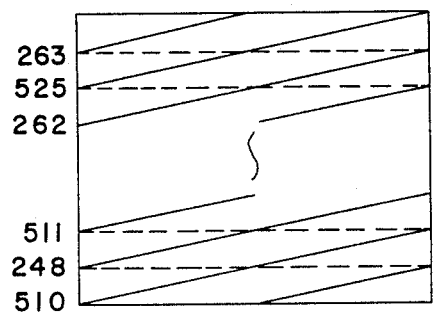
Figures 6A, 6B, 6C:
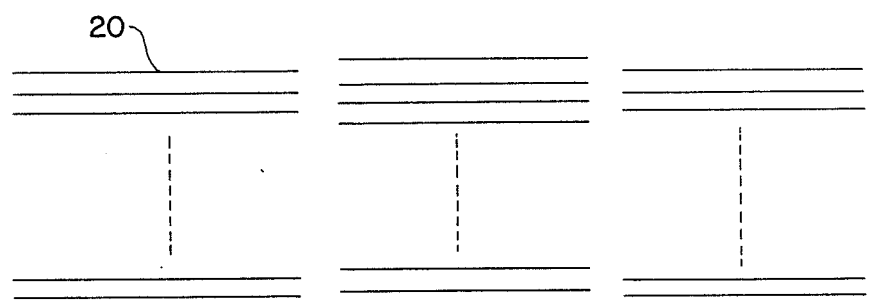
FIG. 6 (a), (b), (c) are diagrams showing display examples of start code and code information by odd-number, even-number field scanning.

Afterwards, when a start code, delivered before display of code information, is displayed in the code information display region of the TV display screen, that start code information in 16-bit composition (FIG. 6 (a)) is introduced in bit sequence into the 8-bit shift registers A, B through the counter 6. Here, for example, if an odd-number field scanning has been done on the TV screen at the time of the start code display, the count of the counter 6 becomes 17, and "0" is set up on the flag 7. Then, in the comparison circuit 9, when the coincidence between the start code information introduced in the shift registers A, B and the start code preliminarily stored in the registers C, D is detected, the comparison circuit 9 delivers a LOW signal to the AND gate 20 to close this gate, thereby prohibiting introduction of data into the registers A and B, while it also delivers a clear signal to clear the counter 6, and delivers a start signal to the timers 11 and 12. Therefore, the timers 11 and 12 deliver a HIGH signal at a specific time as mentioned above after receiving the start signal, and, at this time, since the flag 7 is provided with 0 and only the gate 15 is turned on by its output signal Ⓘ being LOW, only the HIGH signal of timer 11 becomes effective, and is applied to the AND gate 20 and timers 13, 14. The time of opening the AND gate 20 by the HIGH signal of the timer 11 coincides with the display start timing of the coded information in the next even-number field scanning after start code display by the odd-number field scanning, and the subsequent timing of the timer output OFF signal, that is, the timing of the closing of AND gate 20 coincides with the display end timing of the same coded information in the even-number field scanning. Therefore, the coded information (FIG. 6 (b)) displayed by even-number field scanning in the code information display region of the TV screen is read with adequate timing.

The output signal of the timer 11 is also applied to the timers 13 and 14, and these timers 13, 14 deliver a HIGH signal at 262/(30×525) seconds and at 263/(30×525) seconds after the signal is applied respectively. At this time, the T-shaped flip-flop 19 receives LOW signal I and outputs a HIGH signal to open only the gate 18, so that the HIGH signal of the timer 14 is applied to the AND gate 20, thereby opening this gate for a specified period. That is, the coded information in next odd-number field scanning of the even-number field scanning (FIG. 6 (c) is read with accurate timing. After being read, the timers 13, 14 are reset, the output of the T-shaped flip-flop 19 is inverted, the AND gate 17 is opened, and this time the AND gate 20 is opened by the HIGH signal occurring 262/(30×525) seconds later from the timer 13, and the coded information in even-number field scanning is read.

Thereafter, depending on the field scanning of odd number or even number, the timers 13 and 14 are selected alternately. Hence, the coded information display by two-field scanning can be accurately read in synchronism with each scanning timing.

In this constitution, if the field scanning on the TV screen at the time of detection of coincidence is an odd-number field scanning, the coded information displayed next is read at the timing of even-number field scanning, and the code displayed after that is read at the timing of odd-number field scanning, so that the coded information may be accurately read from the TV screen to displaying one coded information signal by two-field scanning of odd number and even number.

As described in detail hereabove, according to the processing device of this invention, even coded information displayed in an interlaced scanning system can be accurately read, being distinguished from other display pictures, so that the coded information may by displayed over the entire display region. Therefore, an increased amount of code information can be read at once without changing the size of display area.

While only certain embodiments of the present invention have been described, it will be apparent to those skilled in the art that various changes and modifications may be made therein without departing from the spirit and scope of the present invention as claimed.

What is claimed is:

1. A display data processing device for processing coded data displayed on a display screen in an interlaced scanning manner, comprising:
    means for reading said coded data displayed on said display screen;
    means for determining whether the coded data read by said means for reading is displayed by an odd-number field or an even number field and producing a signal corresponding to the result of the determination;
    means for storing the coded data read by said means for reading in first and second storage means in response to the signal produced by said means for determining; and
    means responsive to the signal produced by said means for determining for synchronizing the storage of data in said first and second storage means with the timing of an odd-number field scanning or an even-number field scanning.

2. The display data processing device according to claim 1, wherein said means for synchronizing comprises timer means for producing timing signals having a duration equal to an odd-number field scanning period or an even-number field scanning period, according to the signal prduced by said means for determining, and clock generator means for providing a synchronization signal to said first and second storage means in response to said timing signals to cause said first and second storage means to accurately store the data read by said means for reading.

3. The display data processing device according to claim 2, wherein said first and second storage means comprise first and second shift registers clocked by said synchronization signal.

4. The display data processing device according to claim 1, wherein said means for determining comprises counter means for counting the number of bits of coded data read by said means for reading during a predetermined time period.

5. The display data processing device according to claim 1, wherein said means for reading comprises a photosensor.

6. A display data processing device for processing coded data displayed on a display screen in an interlaced scanning manner, comprising:
    means for reading said coded data displayed on said display screen;
    means for counting the coded data read by said means for reading during a predetermined time period;
    means for developing a count signal indicative of an odd-number field or an even-number field in response to said means for counting;
    means for storing the coded data read by said means for reading in first and second storage means in response to said count signal;
    means for producing odd-number field and even-number field timing signals in response to said count signal from said means for developing; and
    means for providing a synchronization signal to said first and second storage means to accurately store the data read by said means for reading.

7. The display data processing device according to claim 6, wherein said first and second storage means comprises first and second shift registers.

8. The display data processing device according to claim 6, wherein said means for producing said odd-number field and even-number field timing signals comprises odd-number field and even-number field timer circuits.

9. A display data processing device for processing coded data display on a display screen in an interlaced scanning manner, comprising:
    first and second register means for storing predetermined odd and even field start codes, respectively;
    reading means for reading said coded data displayed on said display screen;
    counter means for counting the coded data read by said reading means during a predetermined period and developing a count signal indicative of an odd-number field or an even-number field;
    third and fourth register means for storing the coded data read by said reading means in response to said count signal;
    comparing means for comparing said predetermined odd and even field start codes of said first and second register means with the data of said third and fourth register means and producing a flag indicative of whether the data of said third and fourth register means is equal to said predetermined odd and even start codes, respectively; and
    synchronizing means responsive to said flag for synchronizing the storage of data in said third and fourth register means in response to said count signal indicative of said odd-number field or said even-number field.

* * * * *